US011350633B2

(12) United States Patent
Riha

(10) Patent No.: US 11,350,633 B2
(45) Date of Patent: Jun. 7, 2022

(54) **CONIOTHYRIUM MINITANS FOR PROTECTION OF CULTIVATED PLANTS FROM ATTACKS BY FUNGAL PATHOGENS BELONGING TO THE GENUS *PHOMA* SPP. OR *VERTICILLIUM* SPP**

(71) Applicant: Bayer Aktiengesellschaft, Leverkusen (DE)

(72) Inventor: Karel Riha, Brno Modrice (CZ)

(73) Assignee: Bayer Aktiengesellschaft, Leverkusen (DE)

( * ) Notice: Subject to any disclaimer, the term of this patent is extended or adjusted under 35 U.S.C. 154(b) by 51 days.

(21) Appl. No.: 16/344,457

(22) PCT Filed: Nov. 14, 2017

(86) PCT No.: PCT/EP2017/079192
§ 371 (c)(1),
(2) Date: Apr. 24, 2019

(87) PCT Pub. No.: WO2018/087393
PCT Pub. Date: May 17, 2018

(65) Prior Publication Data

US 2019/0320663 A1 Oct. 24, 2019

(51) Int. Cl.
*A01N 63/30* (2020.01)

(52) U.S. Cl.
CPC .................................... *A01N 63/30* (2020.01)

(58) Field of Classification Search
CPC ...................................................... A01N 63/30
See application file for complete search history.

(56) References Cited

U.S. PATENT DOCUMENTS 9,693,565 B2 * 7/2017 Andersch ............... A01N 63/30

FOREIGN PATENT DOCUMENTS

| | | | |
|---|---|---|---|
| CA | 2190125 | A1 | 7/1996 |
| WO | 2014086747 | A2 | 6/2014 |
| WO | 2014086750 | A2 | 6/2014 |
| WO | 2014086758 | A2 | 6/2014 |

OTHER PUBLICATIONS

WO1996021358 Luth etal machine translation from google attached, incorporated by reference by Andersch patent (Year: 1996).*
Salem et al., "Fungitoxicity of some fungicides against to pathogens responsible of olive treets decline in the Chebika's areas in Tunisia" Research in Plant Biology 1(2): 30-39, 2011 (Year: 2011).*
Holmes, G.J., "Gummy Stem Blight and Phoma Blight of Cucurbits," Oct. 31, 1999, retrieved from the Internet: URL:http://www.ces.ncsu.edu/depts/pp/notes/oldnotes/vg8.htm [retrieved on Dec. 11, 2017].
Licciardello, G., "Identification and Detection of Phoma tracheiphila, Causal Agent of Citrus Mal Secco Disease, by Real-Time Polymerase Chain Reaction," Plant Disease, Dec. 1, 2006, vol. 90, No. 12, pp. 1523-1530.
International Search Report and Written Opinion of the International Searching Authority, PCT International Patent Application No. PCT/EP2017/079192, dated Mar. 21, 2018, 18 pages.

* cited by examiner

*Primary Examiner* — Kade Ariani

(57) ABSTRACT

The present invention relates to a method for controlling phytopathogenic fungi of the genus *Phoma* spp. and *Verticillium* spp. comprising applying *Coniothyrium minitans* strain CON/M/91-08 or a mutant having all identifying characteristics of the respective strain in an effective amount to the root system of a plant, to harvest residues or to the soil on which a crop plant grows or is intended to grow. Also disclosed is the use of said strain for controlling phytopathogenic fungi of the genus *Phoma* spp. and *Verticillium* spp.

12 Claims, No Drawings

CONIOTHYRIUM MINITANS FOR PROTECTION OF CULTIVATED PLANTS FROM ATTACKS BY FUNGAL PATHOGENS BELONGING TO THE GENUS *PHOMA* SPP. OR *VERTICILLIUM* SPP

CROSS-REFERENCE TO RELATED APPLICATION(S)

The present application is a 35 U.S.C. § 371 national phase entry of International Application No. PCT/EP2017/079192, filed Nov. 14, 2017, which claims the benefit under 35 U.S.C. § 119 of Czech Patent Application No. 2016-711, filed Nov. 14, 2016, the entire contents of which are hereby incorporated herein by reference.

FIELD OF THE INVENTION

The invention relates the area of specific soil decontamination and biological protection against pathogenic fungi in agriculture and horticulture, specifically the use of the *Coniothyrium minitans* strain for protection of cultivated plants against attacks by fungal pathogens, a preparation for protection of cultivated plants and a method of protection.

BACKGROUND OF THE INVENTION

The *Coniothyrium* genus belongs to the Coelomycetes class, sub-group Deuteromycotina, identified for the first time in 1947 in the United States. The *Coniothyrium minitans* strain CON/M/91-08 in combination with an appropriate carrier is used as a spray fungicide bio-preparation applied on soil or postharvest leftovers. The preparation contains spores of the *Coniothyrium minitans* strain which, after the application into soil, contaminate it and parasitize on present sclerotia of fungi from the *Sclerotinia* spp. genus that cause e.g. white rot of plant roots and degrade them relatively very quickly. *Sclerotium* is a formation created by certain types of organisms, most frequently fungi. The formations can have various shapes, sizes and colors and they are made up of hyphae. They make it possible to survive long harsh periods, for example drought or cold. Particularly after application of a preparation containing the *Coniothyrium minitans* strain on postharvest leftovers the hyperparasite fungus rapidly develops and it even spreads to adjoining sclerotia not directly hit by the spray. The *Coniothyrium minitans* fungus usually develops best in an aerated surface layer of soil ca. 10 cm deep at temperatures over 1° C. and in the presence of sclerotia. When the soil freezes *Coniothyrium minitans* suspends its growth but it does not die. Once the temperature increases the fungus starts to parasitize on sclerotia again and therefore the preparation can be used both in the fall, summer and in the spring months. The exact time point depends on the crop. A precondition for efficiency of the preparation is its mixing into the soil as deep as ca. 5 to 10 cm, immediately after the application.

This spray fungicide bio-preparation is used for protection of various cultivated plants, such as rapeseed, mustard, sunflower, poppy, vegetables, beans, decorative plants, aromatic and curative herbs or chicory, which are all attacked by *Sclerotinia* spp. fungi, particularly by *Sclerotinia sclerotiorum* and *Sclerotinia minor.*

Another common soil pathogen on cultivated plants is e.g. the *Phoma* genus which causes the so-called *phoma* blackening of stems. Black stains appear on the plant's hypocotyl, i.e. on the lowest part of a stem between the root and cotyledons, later the plant starts rotting and dies. The pathogen may also infect the leaves and cover them with irregular brown-grey stains. Fungi from the *Phoma* genus survive on infected postharvest leftovers and they spread in the seed. The only known protection against this pathogen is to remove or to plough in the postharvest leftovers, to sow healthy seed and to apply chemical fungicides.

The *Verticillium* genus hosts further pathogens for cultivated plants that is difficult to eliminate from soil. Pathogens belonging to this genus cause the so-called *verticillium* wilt accompanied by thin foliage of woody plants, partial necrosis of the crown, yellowing and drying of plant leaves, formation of long, oval grey or brownish stains on the stem, blackening of stem, blackening of roots etc. Infection of cultivated plants with this fungus may cause extraordinary losses. The only known protection of plants from this pathogen consists in prevention which includes a broad crop rotation and thorough liquidation of postharvest leftovers.

The purpose of the invention is to find a preparation or a procedure which would effectively eliminate pathogens of the *Phoma* genus and *Verticillium* genus and which would be easy to apply. A bio-preparation is preferred.

SUMMARY OF THE INVENTION

The invention consists in methods of applying and the use of the *Coniothyrium minitans* strain CON/M/91-08 for protection of cultivated plants against attacks by fungal pathogens *Verticillium* spp. and *Phoma* spp. The presence of fungal pathogens from *Verticillium* and *Phoma* genera poses a serious problem to cultivated crops because their elimination is very complicated and no elimination method has been known to protect crops. The *Coniothyrium minitans* CON/M/91-08 fungal strain is commonly used against *Sclerotinia sclerotiorum* and the use of its effects against *Verticillium* and *Phoma* genera is based on completely new findings about the effects of this strain. The *Verticillium* and *Phoma* genera have different morphological cell structures from that of *Sclerotinia sclerotiorum* and therefore one cannot expect the *Coniothyrium minitans* CON/M/91-08 strain to have antagonistic effects and to be efficient also against these types of fungal pathogens.

The subject of this invention is also a preparation for protection of cultivated plants against attacks by fungal pathogens *Verticillium* spp. and *Phoma* spp. The invention consists in the fact that the preparation contains the fungal strain *Coniothyrium minitans* CON/M/91-08 on a nutritious carrier. In a convenient version of the invention the strain in the preparation is in the form of spores, conidia, hyphae or a combination thereof. These forms of the fungal strain *Coniothyrium minitans* subsequently infect pathogens on cultivated plants, parasitize on them and subsequently degrade them. This removes the cause of the infection of cultivated plants and not only its consequences which means a major advantage in comparison with the existing methods.

Another subject of the invention is a method of protection of cultivated plants from attacks by the fungal pathogens *Verticillium* spp. and *Phoma* spp. The invention consists in the fact that the above-described preparation is applied, e.g., on the root system of a cultivated plant, in any case into the soil. It has surprisingly been found that the present *C. minitans* strain is also effective against *phoma* blackening of stem and *verticillium* wilt. With regard to the different morphology of *Verticillium* and *Phoma* genera no analogy can be found with removal of the *Sclerotinia* genus pathogens. In a convenient version of the invention the preparation is applied into the soil in the dose of e.g. 2 kg/ha before sowing of a cultivated plant and it is introduced into the soil up to 10 cm deep.

Advantages of the *Coniothyrium minitans* strain as mentioned above for protection of cultivated plants against attacks by fungal pathogens under this invention consist particularly in the fact that it is active not only against the known pathogen of cultivated plants from the *Sclerotinia* genus against which the *Coniothyrium minitans* strain has been commonly used but also against other pathogens usually occurring in soil used for cultivated plants, i.e. against *Verticillium* spp. and *Phoma* spp. The *Coniothyrium minitans* strain therefore generally improves physiological condition of cultivated plants and, particularly, it is convenient that application of a single bio-preparation can affect several pathogenic genera at a time.

DETAILED DESCRIPTION OF THE INVENTION

In one aspect, the invention relates to a method for controlling phytopathogenic fungi of the genus *Phoma* spp. and *Verticillium* spp. comprising applying *Coniothyrium minitans* strain CON/M/91-08 in an effective amount to the root system of a plant, to harvest residues or to the soil on which a crop plant grows or is intended to grow.

*Coniothyrium minitans* strain CON/M/91-08 is described in WO 96/21358 which is incorporated herein by reference. The strain was deposited with the German Collection of Microorganisms and Cell Cultures having the address Leibniz Institute DSMZ-German Collection of Microorganisms and Cell Cultures, Inhoffenstraβe 7B, 38124 Braunschweig Germany under the accession number DSM 9660 on Mar. 8, 2000. The strain is available as CONTANS® WG from Bayer CropScience Biologics GmbH.

The strain may be cultured according to methods described in WO96/21358. For example the strain can be cultured on suitable substrates, such as seeds of grain, bran or other plant materials, or also with the help of agar culture media that are customary in mycology, such as potato dextrose agar, or malt peptone agar, or on suitable support materials to which a culture medium has been added, as well as in liquid nutrient media without the addition of agar.

Usually the strain is formulated on a carrier, preferably a water-soluble sugar carrier, in a concentration of between $1\times10^7$ and about $3\times10^9$, preferably viable, spores/g of carrier, preferably between $1\times10^8$ and about $2\times10^9$ spores/g carrier. Most preferably, the concentration lies between about $5\times10^8$ and about $1.5\times10^9$ spores/g of carrier, such as at about $1\times10^9$ viable spores/g carrier. In particular the water-soluble sugar is glucose.

According to the invention *Coniothyrium minitans* strain CON/M/91-08 also encompasses mutants having all identifying characteristics of the respective strain. Such identifying characteristics include an activity against at least one plant pathogen of the genus *Phoma* spp. or *Verticillium* spp., in combinations with an activity against *Sclerotinia* spp., such as *Sclerotinia sclerotiorum* and/or *Sclerotinia minor* and/or *Sclerotium cepivorum.*

The term "mutant" refers to a variant of the parental strain as well as methods for obtaining a mutant or variant in which the pesticidal activity is greater than that expressed by the parental strain. The "parent strain" is defined herein as the original strain before mutagenesis. To obtain such mutants the parental strain may be treated with a chemical such as N-methyl-N'-nitro-N-nitrosoguanidine, ethylmethanesulfone, or by irradiation using gamma, x-ray, or UV-irradiation, or by other means well known to those skilled in the art.

A "variant" is a strain having all the identifying characteristics of the respective Accession Numbers as indicated in this text and can be identified as having a genome that hybridizes under conditions of high stringency to the genome of the respective Accession Numbers.

"Hybridization" refers to a reaction in which one or more polynucleotides react to form a complex that is stabilized via hydrogen bonding between the bases of the nucleotide residues. The hydrogen bonding may occur by Watson-Crick base pairing, Hoogstein binding, or in any other sequence-specific manner. The complex may comprise two strands forming a duplex structure, three or more strands forming a multi-stranded complex, a single self-hybridizing strand, or any combination of these. Hybridization reactions can be performed under conditions of different "stringency". In general, a low stringency hybridization reaction is carried out at about 40° C. in 10×SSC or a solution of equivalent ionic strength/temperature. A moderate stringency hybridization is typically performed at about 50° C. in 6×SSC, and a high stringency hybridization reaction is generally performed at about 60° C. in 1×SSC.

A variant of the indicated Accession Number may also be defined as a strain having a genomic sequence that is greater than 85%, more preferably greater than 90% or more preferably greater than 95% sequence identity to the genome of the indicated Accession Number. A polynucleotide or polynucleotide region (or a polypeptide or polypeptide region) has a certain percentage (for example, 80%, 85%, 90%, or 95%) of "sequence identity" to another sequence means that, when aligned, that percentage of bases (or amino acids) are the same in comparing the two sequences. This alignment and the percent homology or sequence identity can be determined using software programs known in the art, for example, those described in Current Protocols in Molecular Biology (F. M. Ausubel et al., eds., 1987) Supplement 30, section 7. 7. 18, Table 7. 7. 1.

The *Coniothyrium minitans* strain may be applied to control plant pathogens of the genus *Phoma* spp. Known plant pathogens belonging to that genus include *Phoma caricae-papayae, Phoma clematidina, Phoma costaricensis, Phoma destructiva, Phoma draconis, Phoma eupyrena, Phoma exigua*, e.g. *Phoma exigua* var. *exigua, Phoma exigua* var. *foveata* or *Phoma exigua* var. *linicola, Phoma glomerata, Phoma glacinicola, Phoma herbarum, Phoma insidiosa, Phoma medicaginis, Phoma, microspore, Phoma narcissi, Phoma nebulosi, Phoma oncidii-sphacelati, Phoma pinodella, Phoma scabra, Phoma sclerotioides, Phoma strasseri, Phoma tracheiphila, Leptosphaeria maculans* (anamorph *Phoma lingam*) and and *Leptosphaeria biglobosa* (the latter two are both causal agent of blackleg disease on *Brassica* crops).

Equally, the present *Coniothyrium minitans* strain may be applied to control plant pathogens of the genus *Verticillium* spp. Members of this genus cause *verticillium* wilt which affects more than 350 species of eudicot plants. The most prominent plant pathogenic *Verticillium* species are *V. dahlia, V. albo-atrum, V. longisporum, V. nubilum* and *V tricorpus* (for an overview, see Barbara, DJ. & Clewes, E. (2003). "Plant pathogenic *Verticillium* species: how many of them are there?" Molecular Plant Pathology 4(4).297-305. Blackwell Publishing).

Plants susceptible to at least one pathogen belonging to the genus *Phoma* spp. and *Verticillium* spp. and which, including their locus of growth, can accordingly be treated according to the present invention include *Abelmoschus esculentus* (also known as Hibiscus *esculentus*) (Okra), *Abutilon* spp. (*Abutilon*), *Acer* spp. (Maple), *Acer negundo* (Box Elder), *Aconitum* (Monkshood, Aconite), *Aesculus hippocastanum* (Horsechestnut), *Aesculus glabra* (Ohio Buckeye), *Ailanthus altissima* (Tree of Heaven), *Albizia* (*Mimosa*), *Amaranthus retroflexus* (Rough Pigweed), *Amelanchier* (Serviceberry), *Antirrhinum majus* (Snapdragon), *Arabidopsis thaliana* (Thale cress), *Arachis hypogaea* (Peanut), *Aralia cordata* (*Udo*), *Aralia racemosa* (American spikenard), *Armoracia lapathifolia* (Horseradish), *Aster* spp. (*Aster*), *Atropa belladonna* (*Belladonna*), *Aucuba* (*Aucuba*), *Berberis* (Barberry), *Brassica* spp. such as *Brassica napus* (Oilseed rape, Rapeseed), *Brassica napobrassica* (Rutabaga, Rapeseed), *Brassica oleracea* var. *botrytis* (Cauliflower), *Brassica oleracea* var. *capitata* (Cabbage) and *Brassica oleracea* var. *gemmifera* (Brussel Sprouts), *Buxus* (Box, boxwood), *Calceolaria* spp. (Slipperwort), *Callirhoe papaver* (Poppy mallow), *Callistephus chinensis* (Chinese *Aster*), *Camellia* (*Camellia*), *Campanula* spp. (Bellflower), *Campsis radicans* (Trumpet Creeper), *Cannabis sativa* (Hemp, Marijuana), *Capsicum* spp. (Pepper), *Carpobrotus edulis* (Ice Plant), *Carthamus tinctorius* (Safflower), *Carya illinoensis* (Pecan), *Catalpa speciosa* (Northern *Catalpa*), *Catalpa bignonioides* (Southern *Catalpa*), *Celosia argentea* (Cockscomb), *Centaurea cyanus* (Cornflower, Bachelor's button), *Centaurea imperialis* (Sweet Sultan), *Ceratonia siliqua* (Carob), *Cercis canadensis* (Redbud), *Cercis siliquastrum* (Judas Tree), *Chenopodium* (Goosefoot), *Chrysanthemum* spp. (*Chrysanthemum*, Marguerite etc.), *Chrysanthemum leucanthemum* (Oxeye Daisy), *Cinnamomum camphora* (Camphor tree), *Cistus palhinhai* (Rock rose), *Cistus*×*purpureus* (Orchid Spot rock rose), *Citrullus vulgaris* (Watermelon), *Cladrastis lutea* (Yellow wood), *Clarkia elegans* (*Clarkia*), *Coreopsis lanceolata* (Tickseed), *Cornus* (Dogwood), *Cosmos* (*Cosmos*), *Cotinus coggygria* (Smoke Tree), *Cupaniopsis anacardioides* (Carrotwood), *Cucumis melo* (Honeydew, Cantaloupe and other melons), *Cucumis sativus* (Cucumber), *Cucurbita pepo* (Pumpkin), *Cydonia oblonga* (Quince), *Cynara cardunculus* (Globe artichoke), *Dahlia variabilis* (*Dahlia*), *Delphinium ajacis* (Rocket larkspur), *Digitalis purpurea* (Foxglove), *Dimorphotheca sinuata* (Cape marigold), *Diospyros virginiana* (persimmon), *Dodonaea viscosa* (Hopseed), *Echinacea purpurea* (Eastern purple coneflower), *Elaeagnus* (*Oleaster*, Russian Olive), *Erica* spp. (Heather), *Erigeron* (Fleabane), *Eschscholzia californica* (California poppy), *Ficus benjamina* (Weeping Fig), *Ficus retusa* (Indian Laurel), *Fragaria chiloensis* (Strawberry), *Fraxinus pennsylvanica* (Ash), *Fremontodendron* spp. (Flannel bush, Fremontia), *Fuchsia* spp. (*Fuchsia*), *Gerbera jamesonii* (Transvaal daisy), *Gossypium* spp. (Cotton), *Gymnocladus dioicus* (Kentucky Coffeetree), *Hebe bollonsii* (*Hebe*), *Hebe*×*carnea 'Carnea'* (*Hebe*), *Hebe lewisii* (*Hebe*), *Hedera* (Ivy), *Helianthus* spp. (Sunflower), *Helichrysum bracteatum* (Strawflower), *Heliotropium arborescens* (Heliotrope), *Impatiens balsamina* (Garden balsam), *Impatiens walleriana* (Busy Lizzie), *Jasminum* (Jasmine), *Juglans regia* (English walnut), *Koelreuteria paniculata* (goldenrain tree), *Lampranthus spectabilis* (Ice plant), *Lathyrus odoratus* (Sweet pea), *Liatris* spp. (Gayfeather), *Ligustrum* spp. (Privet), *Linum usitatissimum* (Linseed), *Liriodendron tulipifera* (tulip tree), *Lobelia erinus* (*Lobelia*), *Lonicera* (Honeysuckle), *Lupinus polyphyllus* (Lupin), *Lycopersicon esculentum* (Tomato), *Maclura pomifera* (Osage orange), *Magnolia* (*Magnolia*), *Matthiola incana* (Stock), *Melia azedarach* (Chinaberry, Persian Lilac), *Mentha* spp. (Mint), *Monarda fistulosa* (Wild Bergamot), *Nandina domestica* (Heavenly bamboo), *Nicotiana benthamiana* (Australian tobacco), *Nyssa sylvatica* (Black Gum), *Olea europaea* (Olive), *Osteospermum* (African daisy), *Paeonia* spp. (Peony), *Panax quinquefolius* (American *ginseng*), *Papaver orientale* (Oriental poppy), *Parthenium argentatum* (Guayule), *Parthenocissus* (Virginia Creeper), *Pelargonium* spp. (*Pelargonium*, Geranium), *Persea americana* (Avocado), *Petunia* (*Petunia*), *Pistacia* (Pistachio), *Phlox* spp. (*Phlox*), *Phellodendron* (Cork Tree), *Physalis alkekengi* (Chinese lantern plant), *Polemonium* spp. (*Polemonium*), *Populus tremula* (European aspen), *Prunus* (Cherry, Plum, Peach, Almond, other stone fruit), *Pyrola* spp. (*Pyrola*), *Quercus* spp. such as *Quercus palustris* (Pin Oak) and *Quercus rubra* (Red oak), *Raphanus sativus* (Radish), *Reseda odorata* (Mignonette), *Rhaphiolepis* (India Hawthorn, Yeddo Hawthorn), *Rheum rhaponticum* (Rhubarb), *Rhododendron* (Azalea, *Rhododendron*), *Rhus* (Sumac, Lemonade berry), *Ribes* (Gooseberry, Black, White, Red and other currants), *Ricinus communis* (Castor bean), *Robinia pseudoacacia* (Black Locust), *Romneya coulteri* (Tree poppy), *Rorippa islandica* (Marsh Cress), *Rosa* (Rose), *Rosmarinus officinalis* (Rosemary), *Rubus* (Black-, Rasp-, Dew- and other berries), *Rudbeckia serotinia* (Black-eyed susan), *Salpiglossis sinuata* (Painted tongue), *Salvia farinacea* (Mealycup sage), *Salvia haematodes* (Sage), *Salvia azurea* (Blue sage), *Sambucus* spp. (Elderberry), *Sassafras variifolium* (*Sassafras*), *Schinus* (Pepper Tree), *Schizanthus pinnatus* (Butterfly flower), *Senecio cruentus* (*Cineraria*), *Senecio vulgaris* (Groundsel), *Sisymbrium irio* (London rocket), *Solanum* spp. such as *Solanum aethiopicum* (Ethiopian Eggplant), *Solanum carolinense* (Carolina horsenettle), *Solanum elaeagnifolium* (White horsenettle), *Solanum melongena* (Eggplant), *Solanum nigrum* (Black nightshade), *Solanum sarrachoides* (Hairy Nightshade) and *Solanum tuberosum* (Potato), *Sorbus torminalis* (Wild Service Tree), *Spinacia oleracea* (Spinach), *Spirea* (Meadowsweet), *Styphnolobium* (Japanese pagoda tree), *Syringa* (Lilac), *Taraxacum officinale* (Dandelion), *Tetragonia tetragonioides* (formerly *T. expansa*) (New Zealand spinach), *Tilia* (Linden), *Trachelospermum jasminoides* (Star jasmine), *Tragopogon porrifolius* (Salsify), *Ulmus americana* (American elm), *Ulmus procera* (English elm), *Ulmus rubra* (Slippery elm), *Venidium* spp. (Namaqualand daisy), *Viburnum* spp. (*Viburnum*, Wayfaring tree), *Vigna sesquipedalis* (Yardlong bean), *Vigna sinensis* (Cowpea), *Vitis* (Grapevine) and *Weigela* (*Weigela*).

Preferred plants are from the genus *Brassica* spp. such as *Brassica napus* (Oilseed rape, Rapeseed), *Brassica napobrassica* (Rutabaga, Rapeseed), *Brassica oleracea* var. *botrytis* (Cauliflower), *Brassica oleracea* var. *capitata* (Cabbage) and *Brassica oleracea* var. *gemmifera* (Brussel Sprouts), *Citrullus vulgaris* (Watermelon), *Cucumis sativus* (Cucumber), *Cucurbita pepo* (Pumpkin), *Fragaria chiloensis* (Strawberry), *Gossypium* spp. (Cotton), *Helianthus* spp. (Sunflower), *Lycopersicon esculentum* (Tomato), *Solanum melongena* (Eggplant) and *Solanum tuberosum* (Potato). Even more preferably, the plant is a *Brassica* spp. plant, such as *Brassica napus*, most preferably winter oilseed rape.

*Coniothyrium minitans* CON/M/91-08 e.g. its conidia, are present in a formulation in a concentration of at least $10^5$ viable spores per gram formulation (e. g. spores/g preparation), such as $10^5$-$10^{17}$ viable spores/kg, preferably $10^7$-$10^{15}$ viable spores/kg, more preferably $10^{10}$-$10^{13}$ viable spores/kg at the time point of applying biological control agents on a plant or plant parts such as seeds, fruits or vegetables. Usual application rates into the solid are between 500 g/ha and 20 kg/ha of a formulation comprising $1\times10^9$ viable spores/g. From this ratio, respective application rates of formulations with a different spore concentration may be calculated by the skilled person. Preferred ranges comprise an application rate of between approximately 1 and approximately 10 kg/ha, such as 8 or 9 kg/ha, furthermore preferred between approximately 1 and approximately 5 kg/ha, for example 1, 2, 3, 4 or 5 kg/ha or any value in between those values. Under certain circumstances and depending on the crop, the application rate may be about 8 kg, in particular if the crop is a vegetable such as lettuce. As a general rule, between $1\times10^{12}$ and $4\times10^{12}$ viable spores/ha are applied. These application rates are applicable both for application to the root system of a plant and to the soil on which a plant grows or is intended to grow, such as in-furrow or as spray. In any case, the conidia need to be worked into the soil.

In a preferred embodiment, said *Coniothyrium minitans* strain is applied in the form of spores, conidia, hyphae or a combination of any of the foregoing. It is preferred that said *Coniothyrium minitans* strain is applied in the form of conidia.

Conidia or conidial spores are asexually formed spores of fungi. Conidia are formed either by morphologically undifferentiated hyphae or frequently by upright hyphae the conidia carriers, or special structures of the fungi, the receptacles. The conidia of *Coniothyrium minitans* are formed in receptacles, the so-called pycnidia. They are therefore also frequently referred to as pycnidia spores. Pycnidia are hollow, usually spherical or pear-shaped asexual receptacles of fungi. Conidia are formed at the inner wall of the pycnidia and frequently develop on short conidia carriers, which are present in large masses.

Hypha (plural—hyphae) are thread-like organs of certain fungi. In their totality, the hyphae form the fungal mycelia by means of longitudinal growth and branching. A fungus essentially consists of the fungal mycelia. The mycelium, in turn, can assume particular forms, which then constitute the organ of the fungus, such as the receptacles.

In another preferred embodiment, said *Coniothyrium minitans* CON/M/91-08, preferably its conidia, are present in a WG (wettable granule) or a liquid formulation. It is preferred that the formulation is a WG formulation.

Suitable applications include an application on harvest residues, and applications to the soil, e.g. during the preplanting process or to the root system of a plant. Normally, with the exception of harvest residues, the respective formulation is worked into the soil to a depth of between 2 and 15 cm, preferably between 5 and 10 cm.

Application to harvest residues: After cultivating a plant, such as a susceptible crop plant, before the initial tilling of the soil, a formulation, preferably a WG formulation, of *Coniothyrium minitans* CON/M/91-08 is applied on infested harvest residues with an applied amount per hectare as described above. For a subsequent summer crop, treatment with preferably takes place in the spring. The formulation is preferably applied immediately before the initial tilling of the stubble into the soil. After the application, the formulation is incorporated with the stubble in the soil. Where cultivation takes place without a plough, the application should be applied where possible in the late autumn when temperatures do not exceed 20° C. and soil stays moist. Where this arises, subsequent rainfall will additionally promote distribution of the spores.

Application to the soil: Before planting, *Coniothyrium minitans* CON/M/91-08 is applied and should be incorporated in the top layer of the soil, advantageously during seedbed preparation or with a combined seed drill. As an alternative to the pre-sowing application, *Coniothyrium minitans* CON/M/91-08 may also be applied during post-emergence. For example, in the case of rapeseed, treatment can take place up to the 4 to 6 leaf stage.

In one embodiment, the method of the invention further comprises applying simultaneously or subsequently at least one further plant protection agent to the root system of a plant, to harvest residues or to the soil on which a crop plant grows or is intended to grow. Preferably, said at least one plant protection agent is a fungicide. It is even more preferred that said fungicide is effective against at least one fungal pathogen selected from of the genus *Sclerotinia* spp., *Phoma* spp. and *Verticillium* spp., preferably at least *Phoma* spp. and *Verticillium* spp. Exemplary fungicides include Azoxystrobin, Pyraclostrobin, Picoxystrobin, Trifloxystrobin, Fluoxastrobin, Isopyrazam, Boscalid, Fluxapyroxad, Fluopyram, Bixafen, Isoflucypram, Penthiopyrad, Pydiflumetofen, Benzovindiflupyr, Prothioconazole, Tebuconazole, Difenoconazole, Flutriafol, Cyprodinil, Fludioxonil, B. *Subtilis* strain QST713, B. *Pumilus* strain QST2808, Carbendazim, Thiophanat-methyl, Procymidone, Iprodione or a mixture of any of the above. Preferably, the fungicide is Prothioconazole or Fluopyram or a mixture thereof.

In another aspect, the present invention relates to the use of *Coniothyrium minitans* strain CON/M/91-08 for controlling phytopathogenic fungi of the genus *Phoma* spp. and *Verticillium* spp. in soil where a crop plant grows or is intended to grow.

The preferred embodiments described for the method of the invention may equally be applied to the use of the invention.

The following example illustrates the invention without limiting it to particular embodiments. Those skilled in the art will find or will be able to provide, based on routine experimenting, one or more equivalents of the embodiments of the invention disclosed herein.

Example 1: Effect of *Coniothyrium Minitans* on *Verticillium* and *Phoma* in Oilseed Rape The preparation/formulation for protection of cultivated plants against attacks by fungal pathogens *Verticillium* spp. and *Phoma* spp. contains $1\times10^{12}$ of active spores of the fungal strain *Coniothyrium minitans* CON/M/91-08 in 1 kg of the preparation. The preparation was applied in the course of August into the soil before sowing of winter rapeseed in the dose 2 kg/ha and introduced into soil 5 cm deep at 20° C.

After harvesting the crop, all postharvest leftovers were collected, i.e. leftovers of stems and roots collected from an accurately outlined square meter of the experimental field and the results were evaluated. The evaluation consisted in counting of green, i.e. live, postharvest leftovers, such as stems, root crowns and roots, and also monitoring of plants attacked by *Phoma* spp. genus, based on cross-cuts of postharvest leftovers and plants attacked by *Verticillium* spp. genus based on erticillium wilt of roots and root crowns.

Table 1 shows the evaluation of postharvest leftovers. The stem part, root crown and roots were each evaluated separately. Table 1 in the first column indicates the ordinal number of repeated evaluation of Contans, a publicly available granular formulation comprising *C. minitans* CON/M/91-08 i.e. the strain used in accordance with this invention, the roman numbers "I, II, HI" mean the individual repetitions. Subsequently, the physiological condition of the individual parts of the plants were evaluated which were subsequently attacked by fungal pathogens of the *Phoma, Verticillium* and *Sclerotinium* genera and the percentage share is subsequently indicated in the table. In the lower part of the table the average values are indicated. The share of green stems increased on average from 19.3% on the untreated control plants to the average of 68.6% on plants treated with the preparation under this invention, which represents an increase by about two thirds. The share of prematurely ripened stems decreased on average from 80.7% on untreated plants to the average of 31.4% on plants treated with the preparation under this invention, i.e. a reduction by three fifths. Similar results were obtained for root crowns and roots as shown in Table 1. In all the cases *sclerotinia* were eliminated from the stems, root crowns/stalk basis and roots and also the risk of attacks by other diseases extremely decreased, such as *phoma* blackening of stem on the plant's section to the extent leading to dying or premature ripening of the plant caused by *Phoma* spp., while application of the preparation under this invention reduced the attacks on average from 62.5% to 28.7%, i.e. by more than one half, in comparison with the control sample not treated by the preparation. The application also reduced attacks by other dangerous diseases, specifically by *Verticillium* spp. on the roots, while the application of the preparation under this invention reduced the attacks on average from 58.9% to 19.7%, i.e. by 39% of the original value of the control sample, which means a decrease by two thirds (see Table 1).

TABLE 1

| | stem | | Stalk basis | | | | stem degree infestation | | | | |
|---|---|---|---|---|---|---|---|---|---|---|---|
| repeat | Number of green | Prematurely ripened | Number of green | Severely | roots | | *Phoma lingam* | | | degree | root |
| sequence number | stems (non infested) | stems (infested) | non infested | infested (generally) | Non infested | infested | cut of the plant | *Sclerotinia* on stem | *Sclerotinia* on basis | *Vertcilium* on root | diameter mm |
| Contans I. | 26 | 10 | 19 | 6 | 21 | 7 | 11 | total | 0 | 7 | |
| Contans I. % | 72.2 | 27.8 | 52.8 | 16.6 | 58.3 | 19.4 | 30.6 | | 0 | 19.4 | |
| Contans II. | 26 | 14 | 26 | 16 | 27 | 12 | 12 | total | 0 | 8 | |
| Contans II. % | 65 | 35 | 65 | 40 | 67.5 | 30 | 30 | | 0 | 20 | |
| Contans III. | 35 | 16 | 35 | 18 | 37 | 14 | 13 | total | 0 | 10 | |
| Contants III. % | 68.6 | 31.4 | 68.6 | 35.3 | 72.6 | 27.5 | 25.5 | | 0 | 19.6 | |
| Untreated I. | 13 | 49 | 16 | 47 | 16 | 44 | 36 | total | 13 | 39 | |
| Untreated I. % | 21 | 79 | 25.8 | 75.8 | 25.8 | 71 | 58.1 | | 21 | 62.9 | |
| Untreated II. | 8 | 41 | 7 | 30 | 5 | 29 | 38 | total | 10 | 22 | |
| Untreated II. % | 16.3 | 83.7 | 14.3 | 61.2 | 10.2 | 59.2 | 77.6 | | 20.4 | 44.9 | |
| Untreated III. | 12 | 46 | 8 | 47 | 5 | 35 | 30 | total | 9 | 40 | |
| Untreated III. % | 20.7 | 79.3 | 13.8 | 81 | 8.6 | 60.3 | 51.7 | | 15.5 | 69 | |
| Average Contans | 29 | 13.33 | 26.67 | 13.33 | 28.33 | 11 | 12 | | 0 | 8.3 | 15.2 |
| Average Contans % | 68.6 | 31.4 | 62.1 | 30.6 | 66.1 | 25.6 | 28.7 | | 0 | 19.7 | |
| Average untreated | 11 | 45.3 | 10.3 | 41.3 | 8.7 | 36 | 34.7 | | 10.6 | 33.7 | 13.4 |
| Average untreated % | 19.3 | 80.7 | 18 | 72.7 | 14.9 | 63.5 | 62.5 | | 19 | 58.9 | |

The invention claimed is:

1. A method for controlling phytopathogenic fungi of the genus *Phoma* spp. and *Verticillium* spp. consisting essentially of applying an effective amount of *Coniothyrium minitans* strain CON/M/91-08 (DSM 9660) or a mutant thereof having all identifying characteristics of the respective strain that exhibits activity against said phytopathogenic fungi of the genus *Phoma* spp. or *Verticillium* spp., and a carrier system to the root system of a plant, to harvest residues or to the soil on which a crop plant grows or is intended to grow to control said phytopathogenic fungi of the genus *Phoma* spp. and *Verticillium* spp., thereby protecting said plant or crop plant against fungal pathogens *Verticillium* spp. and *Phoma* spp.

2. The method according to claim 1, wherein said *Coniothyrium minitans* strain is applied in the form of spores, conidia, hyphae or a combination thereof.

3. The method according to claim 1, wherein said *Coniothyrium minitans* strain is applied in the form of conidia.

4. The method according to claim 3, wherein said conidia are present in a wettable granule (WG) or a liquid formulation.

5. The method according to claim 4, wherein said formulation is a WG formulation.

6. The method according to claim 1, wherein said *Coniothyrium minitans* strain is applied pre-planting, during growth or post-harvest.

7. The method according to any claim 6, wherein said *Coniothyrium minitans* strain is applied pre-planting.

8. The method according to claim 1, wherein said plant is of the genus *Brassica* spp.

9. The method according to claim 8, wherein said plant is *Brassica napus*.

10. The method according to claim 9, wherein said *Brassica napus* plant is winter oilseed rape.

11. The method according to claim 1, wherein said *Coniothyrium minitans* strain is applied at an application rate of between about 500 g/ha and about 20 kg/ha in a formulation comprising about $1\times10^9$ viable spores/g.

12. The method according to claim 1, wherein said *Coniothyrium minitans* strain is applied at an application rate of between about $1\times10^{12}$ and about $4\times10^{12}$ viable spores/ha.

* * * * *